United States Patent
Hassan et al.

(10) Patent No.: US 12,360,311 B2
(45) Date of Patent: Jul. 15, 2025

(54) PROCESS FOR FABRICATING A PHOTONICS-ON-SILICON OPTOELECTRONIC SYSTEM COMPRISING AN OPTICAL DEVICE COUPLED TO AN INTEGRATED PHOTONIC CIRCUIT

(71) Applicant: Commissariat à l'Energie Atomique et aux Energies Alternatives, Paris (FR)

(72) Inventors: Karim Hassan, Grenoble (FR); Quentin Wilmart, Grenoble (FR); Bertrand Szelag, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 303 days.

(21) Appl. No.: 17/932,033

(22) Filed: Sep. 14, 2022

(65) Prior Publication Data

US 2023/0086803 A1 Mar. 23, 2023

(30) Foreign Application Priority Data

Sep. 14, 2021 (FR) ...................................... 21 09593

(51) Int. Cl.
*G02B 6/12* (2006.01)
*G02B 6/13* (2006.01)

(52) U.S. Cl.
CPC ........... *G02B 6/12004* (2013.01); *G02B 6/13* (2013.01); *G02B 2006/12061* (2013.01); *G02B 2006/12104* (2013.01)

(58) Field of Classification Search
CPC ................. G02B 6/12004; G02B 6/13; G02B 2006/12061; G02B 2006/12104
See application file for complete search history.

(56) References Cited

U.S. PATENT DOCUMENTS

| | | | |
|---|---|---|---|
| 10,197,730 B1 * | 2/2019 | Ngu .................... | G02B 6/12002 |
| 11,715,728 B2 * | 8/2023 | Yu ...................... | H01L 31/02327 |
| | | | 257/431 |
| 2015/0140720 A1 * | 5/2015 | Collins .................... | G02B 6/13 |
| | | | 438/65 |
| 2016/0377806 A1 | 12/2016 | Ellis-Monaghan et al. | |
| 2021/0239903 A1 | 8/2021 | Bian et al. | |

OTHER PUBLICATIONS

French Preliminary Search Report Issued May 11, 2022 in French Application 21 09593 filed on Sep. 14, 2021 (with English Translation of Categories of Cited Documents), 3 pages.

* cited by examiner

*Primary Examiner* — Thomas A Hollweg
*Assistant Examiner* — Marc E Manheim
(74) *Attorney, Agent, or Firm* — Oblon, McClelland, Maier & Neustadt, L.L.P.

(57) ABSTRACT

A process for fabricating an optoelectronic system having an optical device coupled to an integrated photonic circuit includes producing a lower waveguide from the thin single-crystal-silicon layer of a first SOI substrate, then joining a second SOI substrate thereto and producing an intermediate waveguide from the thin single-crystal-silicon layer of the second SOI substrate.

15 Claims, 8 Drawing Sheets

PROCESS FOR FABRICATING A PHOTONICS-ON-SILICON OPTOELECTRONIC SYSTEM COMPRISING AN OPTICAL DEVICE COUPLED TO AN INTEGRATED PHOTONIC CIRCUIT

TECHNICAL FIELD

The field of the invention is that of photonics-on-silicon optoelectronic systems comprising an optical device, such as a hybrid semiconductor laser source, optically coupled to an integrated photonic circuit.

PRIOR ART

Generally, a photonics-on-silicon optoelectronic system may comprise an optical device, such as a laser source, optically coupled to an integrated photonic circuit. The laser source is produced based on a semiconductor compound, for example a III-V compound such as InP, and the integrated photonic circuit is produced from an SOI substrate (SOI standing for Silicon-On-Insulator). The integrated photonic circuit comprises passive optical components (waveguides, multiplexers, couplers, etc.) and/or active optical components (modulators, photodetectors, etc.), including one waveguide optically coupled to the laser source.

The laser source is said to be hybrid in so far as the optical cavity is defined by reflectors located in the integrated photonic circuit. More precisely, the laser source is formed from an active waveguide produced based on the semiconductor compound that forms the gain medium. In the case of a DBR laser (DBR standing for Distributed Bragg Reflector), the optical cavity is bounded by two Bragg gratings located in the integrated waveguide, which gratings form wavelength-selective mirrors. In the case of a DFB laser (DFB standing for Distributed FeedBack), the same Bragg grating extends in the integrated waveguide over the entire length of the optical cavity.

However, it may be advantageous to produce an additional element coupled on the one hand to the active waveguide and on the other hand to the waveguide called the lower waveguide of the integrated photonic circuit. In this regard, document U.S. Ser. No. 10/488,587B2 describes one example of such an optoelectronic system comprising a III-V/Si hybrid laser source coupled to the integrated photonic circuit by way of an additional element that is separated from the lower waveguide by a thin oxide layer. The lower waveguide and the passive and active optical components are produced from the thin single-crystal-silicon layer of an SOI substrate. The lower waveguide thus has a small thickness, typically smaller than or equal to about 300 nm, propitious to good operation of the various optical components of the integrated photonic circuit. It may then be preferable, as said document describes, to provide an additional element made of silicon, of a thickness different from that of the lower waveguide. Thus, whereas the thickness of the lower waveguide depends on the operating constraints on the optical components of the integrated photonic circuit, the thickness of this additional element is chosen to optimize the optical coupling to the active waveguide.

The process for fabricating such an optoelectronic system then comprises a step of producing the integrated photonic circuit from the thin single-crystal-silicon layer of an SOI substrate; a step of producing the intermediate waveguide by wafer-scale deposition of amorphous silicon, which is then etched locally; and a step of producing the active waveguide of the hybrid laser source by direct bonding of a stack forming a semiconductor heterostructure.

However, the production of this additional element therefore comprises operations of silicon deposition and of planarization by chemical-mechanical polishing (CMP), this potentially making it complex to obtain an additional element having the desired dimensions and in particular a uniform thickness. Specifically, the operation of chemical-mechanical polishing may lead to the formation of a depression in the additional amorphous-silicon element: a concavity may form in the amorphous silicon from its top side, resulting in a non-uniformity in the thickness of the additional element. Thus, there is a need to provide a process for fabricating such an optoelectronic system that allows an additional element having the desired dimensions, and in particular a uniform thickness, to be obtained.

Document US 2016/377806 A1 is also known, this document describing production of upper and lower waveguides coupled to each other by an intermediate waveguide that extends vertically. The lower waveguide is produced from a first SOI substrate and the upper waveguide is produced from a second SOI substrate. The intermediate waveguide is produced after the two SOI substrates have been joined, and after the upper waveguide has been produced.

SUMMARY OF THE INVENTION

The objective of the invention is to at least partially remedy the drawbacks of the prior art, and more particularly to provide a process for fabricating an optoelectronic system comprising an optical device coupled by an intermediate waveguide to an integrated photonic circuit, the intermediate waveguide of which has the desired dimensions, and that runs a low risk of degrading the performance expected from the optoelectronic system.

To this end, one subject of the invention is a process for fabricating a photonics-on-silicon optoelectronic system comprising an optical device and an integrated photonic circuit, the optical device comprising a waveguide, called the upper waveguide, and the integrated photonic circuit comprising a waveguide, called the lower waveguide, that is made of single-crystal silicon and that extends in a lower plane, the upper waveguide being optically coupled to the lower waveguide by a waveguide, called the intermediate waveguide, that is made of silicon and that extends in an intermediate plane that is distinct from and parallel to the lower plane.

The process comprises the following steps: providing a first silicon-on-insulator substrate comprising a first thin single-crystal-silicon layer that is of a first thickness e1 and that has a first side, called the back side, which is oriented toward a buried-oxide layer of the first silicon-on-insulator substrate, and an opposite second side, called the front side; producing the lower waveguide by etching the first thin silicon layer locally; then producing the intermediate waveguide; then producing the upper waveguide of the optical device.

According to the invention, the step of producing the intermediate waveguide comprises the following operations: joining the first silicon-on-insulator substrate to a second silicon-on-insulator substrate comprising a second thin single-crystal-silicon layer of a second thickness e2 different from e1, the second thin silicon layer being located facing the integrated photonic circuit; removing a carrier substrate and a buried-oxide layer of the second silicon-on-insulator substrate, so as to free one side of the second thin silicon layer; producing the intermediate waveguide by etching the second thin silicon layer locally (in other words, the second thin silicon layer, etched locally, forms the intermediate waveguide).

The following are certain preferred but nonlimiting aspects of this fabricating process.

The intermediate waveguide may be partially superposed both with the lower waveguide and with the upper waveguide, along an axis orthogonal to the planes in question. More precisely, it may comprise a portion superposed with the lower waveguide, and another portion superposed with the upper waveguide.

The lower waveguide may have a uniform thickness equal to the value e1, and the intermediate waveguide may have a uniform thickness equal to the value e2.

The second silicon-on-insulator substrate may be joined by direct oxide/oxide bonding to the first silicon-on-insulator substrate, a thin bonding layer based on an oxide being deposited on the second thin silicon layer, and a thin oxide layer covering the integrated photonic circuit, the first and second silicon-on-insulator substrates being joined by bringing the thin bonding layer into contact with the thin oxide layer.

The thin oxide layer may be produced by thinning the buried-oxide layer of the first silicon-on-insulator substrate.

The process may comprise, following production of the integrated photonic circuit, which comprises active optical components, a step of producing, front side, an interconnect portion comprising metallization levels that are connected to the active optical components by conductive vias that extend through an inter-metal insulating layer.

The process may comprise, subsequently to production of the interconnect portion, steps of joining a handle to a free side of the interconnect portion, then of removing a carrier substrate of the first silicon-on-insulator substrate, then of thinning the buried-oxide layer to obtain a thinned buried-oxide layer.

The thin oxide layer may be produced by depositing an oxide on the front side of the integrated photonic circuit.

The process may comprise a step of producing at least one Bragg mirror by forming through-notches in the first thin silicon layer, which through-notches are then filled with an electrically insulating material, the through-notches being produced simultaneously to production of at least one waveguide of the integrated photonic circuit, in the same local etching step.

The Bragg mirror may make contact with the buried-oxide layer of the first silicon-on-insulator substrate.

The invention also relates to a photonics-on-silicon optoelectronic system comprising an optical device and an integrated photonic circuit: the optical device comprises a waveguide, called the upper waveguide; the integrated photonic circuit comprises a waveguide, called the lower waveguide, that is made of single-crystal silicon and that extends in a lower plane; the upper waveguide is optically coupled to the lower waveguide by a waveguide, called the intermediate waveguide, that is made of silicon and that extends in an intermediate plane that is distinct from and parallel to the lower plane; the intermediate waveguide is made of single-crystal silicon.

The optical device may be chosen from a modulator, a photodiode, a semiconductor optical amplifier, or a laser source in which the upper waveguide is an active waveguide containing a gain medium. The upper waveguide may be made of a semiconductor based on a III-V compound, on a IV element or compound, or on a II-VI compound. Reference is here being made to columns of the periodic table of the elements.

The lower waveguide may have a uniform thickness e1 smaller than 350 nm, and the intermediate waveguide may have a uniform thickness e2 comprised between 400 nm and 600 nm.

The optoelectronic system may comprise at least one Bragg mirror produced from single-crystal silicon and located coplanar with the lower waveguide.

The Bragg mirror may extend under and along the intermediate waveguide and be evanescently coupled thereto, the optical device being a distributed-feedback laser source. As a variant, the optoelectronic system may comprise two Bragg mirrors located under the intermediate waveguide, the optical device being a distributed-Bragg-reflector laser source.

The optoelectronic system may comprise at least one heater located, on the front side of the integrated photonic circuit, facing the Bragg mirror, the heater being one of the metallization levels of an interconnect portion comprising metallization levels that are connected to the active optical components of the integrated photonic circuit by conducting vias that extend through an inter-metal insulating layer.

BRIEF DESCRIPTION OF THE DRAWINGS

Other aspects, aims, advantages and features of the invention will become more clearly apparent on reading the following detailed description of preferred embodiments thereof, this description being given by way of non-limiting example and with reference to the appended drawings, in which.

DETAILED DESCRIPTION OF PARTICULAR EMBODIMENTS

Figure 1A:
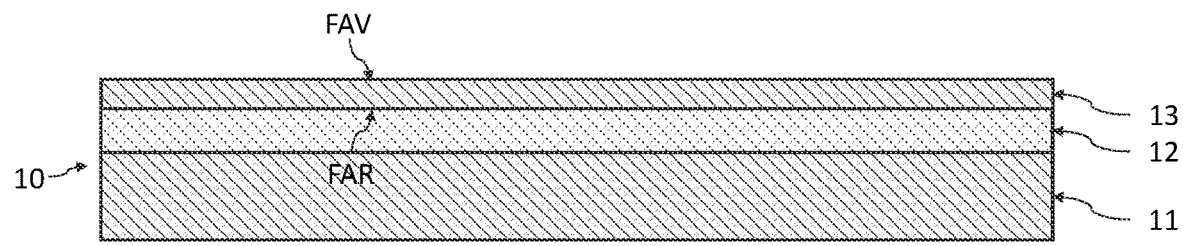
FIGS. 1A to 1I are schematic and partial cross-sectional views illustrating various steps of a process for fabricating an optoelectronic system according to a first embodiment in which the optical device is a laser source and in which the active waveguide of the laser source is located on the back side FAR of the integrated photonic circuit.

In the figures and in the remainder of the description, the same references have been used to designate identical or similar elements. In addition, the various elements have not been shown to scale for the sake of clarity of the figures. Moreover, the various embodiments and variants are not mutually exclusive and may be combined with one another. Unless indicated otherwise, the terms "substantially", "about" and "of the order of" mean to within 10%, and preferably to within 5%. Moreover, the terms "comprised between . . . and . . . " and equivalents mean inclusive of limits, unless indicated otherwise.

The invention relates to an optoelectronic system and to its fabricating process, the optoelectronic system comprising an optical device and an integrated photonic circuit that are optically coupled to each other by an intermediate waveguide made of single-crystal silicon. The optical device comprises a waveguide, called the upper waveguide, that contains the gain medium, and the integrated photonic circuit comprises a lower waveguide made of single-crystal silicon and at least one active or passive optical component (waveguide, modulator, photodiode, coupler, etc.).

According to the invention, the upper and lower waveguides are coupled to each other by an intermediate waveguide made of single-crystal silicon. The lower waveguide extends (i.e. extends longitudinally, lengthwise) in a plane, called the lower plane, and the intermediate waveguide extends (i.e. longitudinally) in a plane, called the intermediate plane, that is distinct from and parallel to the lower plane. Moreover, the upper waveguide here also extends in a plane (called the upper plane) that is distinct from and parallel to the lower and intermediate planes. The optical device may notably be a hybrid laser source, a modulator, a photodiode, or a semiconductor optical amplifier.

In addition, the integrated photonic circuit and its lower waveguide are produced from the thin single-crystal-silicon layer of a first SOI substrate. The intermediate waveguide is produced from the thin single-crystal-silicon layer of a second SOI substrate, which is joined to the first SOI substrate beforehand. Thus, the lower waveguide has a thickness e1 that depends on the thickness required for the one or more optical components of the integrated photonic circuit to operate correctly and perform as they should, and the intermediate waveguide has a thickness e2 that is different from e1 and that is chosen to optimize the optical coupling to the upper waveguide. Preferably, the thickness e2 is strictly larger than the thickness e1, in particular when the optical device is a laser source. This intermediate waveguide is thus produced without implementing operations of deposition of amorphous silicon and of planarization by chemical-mechanical polishing. It thus has the desired dimensions, and in particular a uniform thickness, this allowing the risk of degradation of the performance of the optoelectronic system to be decreased. Thickness is defined along the vertical axis Z, which is orthogonal to the planes in which the waveguides extend longitudinally.

FIGS. 1A to 1I illustrate, schematically, steps of a process for fabricating an optoelectronic system 1 according to a first embodiment. In the rest of the description, the optical device is a hybrid laser source. The upper waveguide is called the active waveguide and comprises a gain medium. In this example, the active waveguide 61 of the laser source 60 is located on the back side FAR of the integrated photonic circuit 20. Moreover, by way of illustration, the laser source 60 is a III-V/Si laser source in so far as the active waveguide 61 is produced based on a III-V compound, and in so far as the integrated photonic circuit 20 is produced based on silicon. It will however be noted that the upper waveguide 61 may be produced based on a III-V compound, for example based on InP or GaAs, based on a IV element such as germanium or a IV compound such as GeSn or SiGe, or based on a II-VI compound such as CdHgTe.

An orthogonal three-dimensional direct coordinate system XYZ, in which the XY-plane is a plane parallel to the main plane of the integrated photonic circuit 20, and in which the Z-axis is oriented from the integrated photonic circuit 20 toward the active waveguide 61 of the laser source 60, is defined here and will be referred to in the rest of the description.

With reference to FIG. 1A, a first SOI substrate 10 (SOI standing for Silicon On Insulator) is provided, said substrate being formed from a stack, along the Z-axis, of a silicon carrier substrate 11, of a buried-oxide layer 12 (also known as the BOX) made of a silicon oxide, and of a thin single-crystal-silicon layer 13. This thin silicon layer 13 has a first side, called the front side FAV, and an opposite second side, called the back side FAR, that is oriented toward the buried-oxide layer. The thickness e1 of the thin silicon layer 13 is uniform and its value is chosen to ensure the passive and active optical components of the integrated photonic circuit 20 operate correctly. By way of example, the thickness e1 is smaller than or equal to about 350 nm, and for example comprised between about 170 nm and 310 nm, and is here equal to about 220 nm.

Figure 1B:
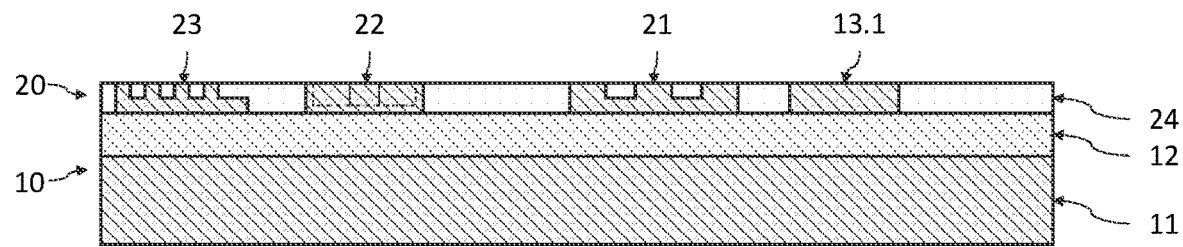

With reference to FIG. 1B, the integrated photonic circuit 20 is produced from the thin single-crystal-silicon layer 13 by structuring (partial or complete local etching) and optionally doping by ion implantation. Said integrated photonic circuit comprises optical components, including the lower waveguide 13.1 and the least one passive or active optical component. By way of illustration, the integrated photonic circuit 20 here comprises, apart from the lower waveguide 13.1, an optical modulator 21, a photodiode 22 (for example comprising epitaxially grown germanium), and a grating coupler 23.

The lower waveguide 13.1 is produced by etching right through the thin silicon layer 13 locally. In other words, the locally etched thin layer 13 forms the lower waveguide 13.1. It therefore has a uniform thickness equal to the value e1. No operation is carried out to increase its thickness locally (deposition then planarization by chemical mechanical polishing, etc.). Thus, it is ensured that the lower waveguide 13.1 actually has the desired dimensions. Lastly, an insulating layer 24 made of an electrically insulating material such as a dielectric, an oxide for example, is deposited so as to fill the gaps in the XY-plane between the various components of the integrated photonic circuit 20.

Figure 1C:
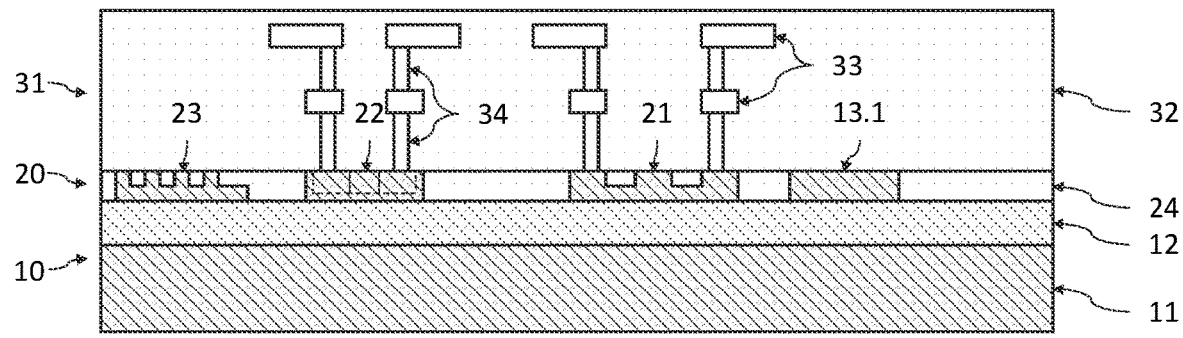

With reference to FIG. 1C, an interconnect portion 31 for interconnecting the integrated photonic circuit 20 is formed, said interconnect portion being formed from a plurality of metallization levels 33 and from conductive vias 34 that extend through an insulating layer 32. This interconnect portion 31 is conventionally called the BEOL portion (BEOL standing for Back End Of Line), and the insulating layer 32 is called the IMD (IMD standing for Inter-Metal Dielectric).

This step is carried out via operations of deposition and of planarization by chemical-mechanical polishing of metal (copper for example) and dielectric (silicon oxide for example). The metallization levels 33 and the conductive vias 34 allow the optical components to be connected to contact pads 72 (see FIG. 1I) and may also connect the optical components to one another.

It will be noted that one of the metallization levels 33 may be located facing the grating coupler in order to form a metal mirror (not shown) and thus improve the extraction of the light beam. Moreover, metallization levels 33 may be located facing Bragg mirrors to form heaters allowing the wavelength of the laser source 60 to be tuned (see FIGS. 4A and 4C).

Figure 1D:
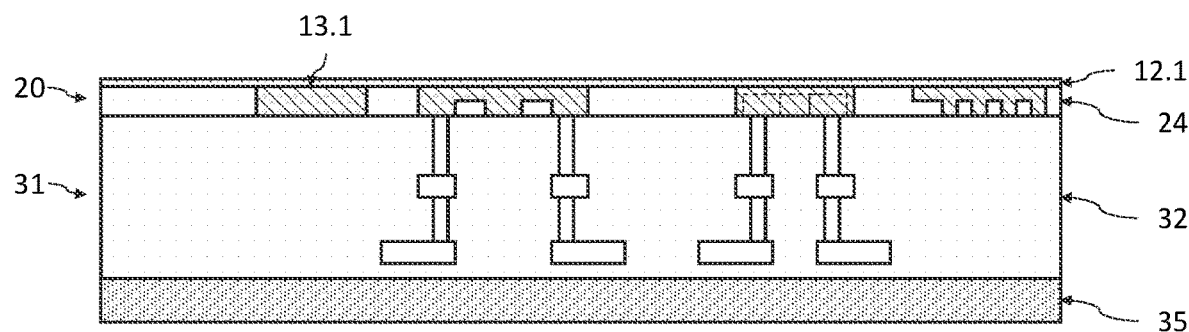

With reference to FIG. 1D, a temporary or permanent handle 35 is joined to the free side of the interconnect portion 31. This handle 35 may be a silicon substrate that is joined by bonding. The stack is then flipped and the carrier substrate 11 of the 501 substrate removed, for example by chemically etching the silicon selectively to the oxide, the etching optionally being preceded by grinding. Next, the buried-oxide layer 12 is thinned to leave only a partial thickness, for example of the order of 50 nm to 150 nm. This thinning may be achieved by chemical etching, dry etching or even chemical-mechanical polishing (CMP). Thus, the thinned buried-oxide layer 12.1 protects the optical components of the integrated photonic circuit 20 and will enable oxide-oxide direct bonding of the second SOI substrate 40. It will be noted that the thinned buried-oxide layer 12.1 has a uniform thickness in the XY-plane in so far as, on the one hand, the carrier substrate 11 initially had a uniform thickness, and, on the other hand, the carrier substrate 11 was removed by etching the silicon selectively to the oxide.

Figure 1E:
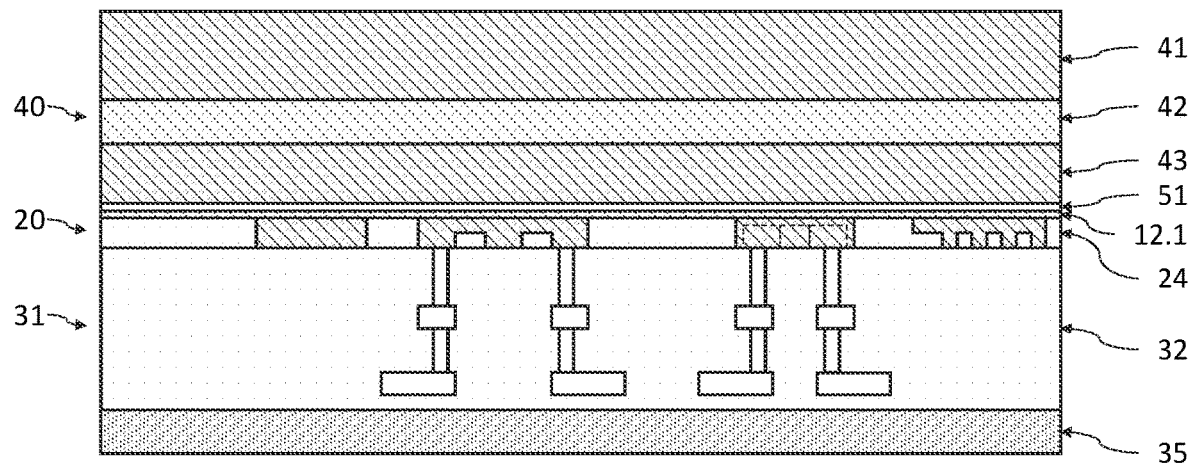

With reference to FIG. 1E, a second SOI substrate 40 is joined to the stack obtained beforehand, and here to the free side of the thinned buried-oxide layer 12.1. The SOI substrate 40 is oriented so that the thin single-crystal-silicon layer 43 is located facing the integrated photonic circuit 20. The two SOI substrates may for example be joined by direct oxide-oxide bonding, using a thin oxide bonding layer 51 deposited on the SOI substrate 40.

The second substrate 40 is therefore also a silicon-on-insulator substrate, and is formed from a stack of a silicon carrier substrate 41, of a buried-oxide layer 42 made of a silicon oxide, and of a thin single-crystal-silicon layer 43. This thin silicon layer 43 has a thickness e2 the value of which is different from the value e1 and preferably larger than e1 in order to optimize the optical coupling between the intermediate waveguide 43.1 and the active waveguide 61, and is configured to optimize the optical coupling to the active waveguide 61. By way of example, the thickness e2 is larger than 350 nm, and for example comprised between about 400 to 600 nm, and is here equal to about 500 nm. The thin bonding layer 51 is deposited on the free side of the thin silicon layer 43, and the SOI substrate 40 is joined to the stack obtained beforehand by bringing the thin bonding layer 51 into contact with the thinned buried-oxide layer 12.1. Thus, the thin silicon layer 43 is oriented toward the integrated photonic circuit 20.

The thin bonding layer 51 and the thinned buried-oxide layer 12.1 have a cumulative thickness such as to optimize the optical coupling between the lower waveguide 13.1 and the intermediate waveguide 43.1, and that is for example comprised between about 50 nm and 300 nm. This thickness is uniform in the XY-plane since it is defined by the two thin layers 51, 12.1, which are produced in a controlled manner. Moreover, it is possible to adjust the local thickness of the thin bonding layer 51 in order to compensate for any spatial variation in the local thickness of the thinned buried-oxide layer 12.1. It will be noted that the thin bonding layer 51 may also be formed by oxidizing one portion of the thickness of the thin silicon layer 43, although it remains preferable for it to be a thin deposited layer.

Moreover, the SOI substrate 40 may be a wafer, for example of diameter larger than a few tens or even hundreds of millimeters. As a variant, and preferably, it may be a die, i.e. one portion of a wafer, in order thus to decrease costs and also to limit the mechanical stresses undergone by the stack of two SOI substrates 10, 40 joined to each other.

Figure 1F:
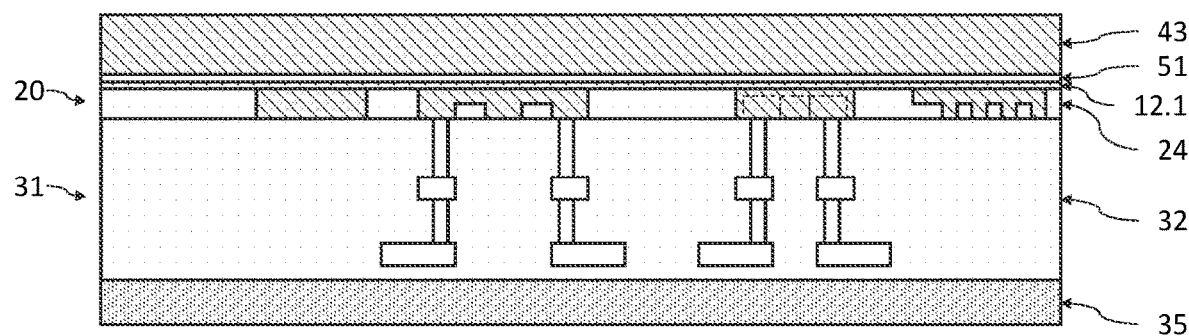

With reference to FIG. 1F, the carrier substrate 41 and the buried-oxide layer 42 are removed, as described above, to uncover the thin silicon layer 43 and thus free its surface. At this stage, the thin silicon layer 43 at least partially covers the integrated photonic circuit 20, and at least the lower waveguide 13.1. Said thin silicon layer has a thickness e2 the value of which will be that of the intermediate waveguide 43.1 (see FIG. 1G), this thickness allowing the optical coupling of the latter to the active waveguide 61 to be optimized.

It will be noted that, in the case of transfer of an SOI die 40, when removing the carrier substrate 41 and the buried-oxide layer 42, it is important not to degrade the subjacent oxide layers. To this end, it is possible to deposit, after transfer of the die 40, an SiN film in a non-conformal manner (for example by sputter deposition) to protect the subjacent oxide and the base of the die 40. Mechanical thinning followed by a chemical etch of the carrier substrate 41 and of the buried-oxide layer 42 will then for example possibly be implemented. The SiN layer will then possibly be removed chemically via an etch selective to oxide.

Figure 1G:
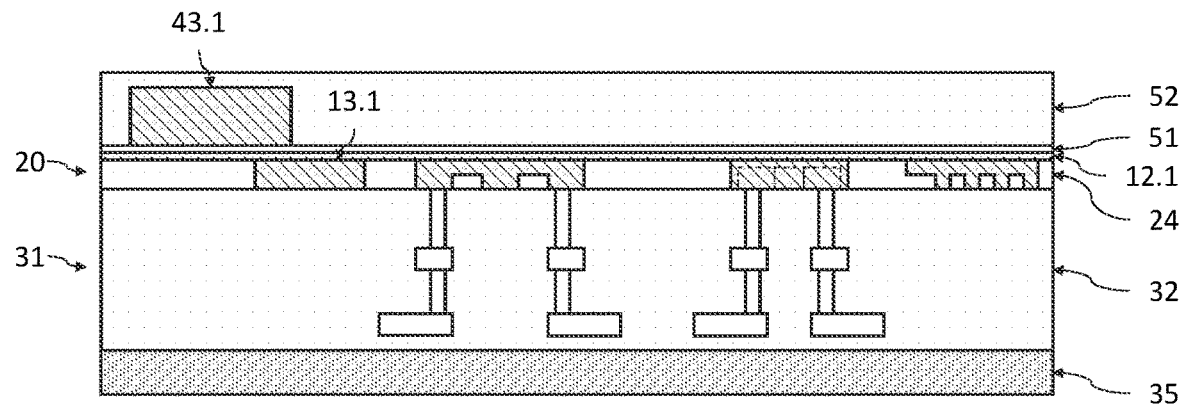

With reference to FIG. 1G, the intermediate waveguide 43.1 is produced by photolithography and local etching of the thin silicon layer 43. In other words, the locally etched thin layer 43 forms the lower waveguide 43.1. To this end, the photolithography operation may use alignment marks produced beforehand in the thin silicon layer 13 of the SOI substrate 10. Next, the thin silicon layer 43 is etched locally right through its thickness to uncover the thin bonding layer 51. The local etch may use a hard mask or a resist mask.

Lastly, an encapsulating layer 52 made of an insulating material, for example a dielectric such as an oxide, is deposited so as to cover the intermediate waveguide 43.1 and the thin bonding layer 51. A planarization of the encapsulating layer 52 allows a planar free side to be obtained. The local thickness of the encapsulating layer 52 above the intermediate waveguide 43.1 is chosen to optimize the optical coupling between the latter and the active waveguide 61. It may for example be of the order of 100 nm.

Figure 1H:
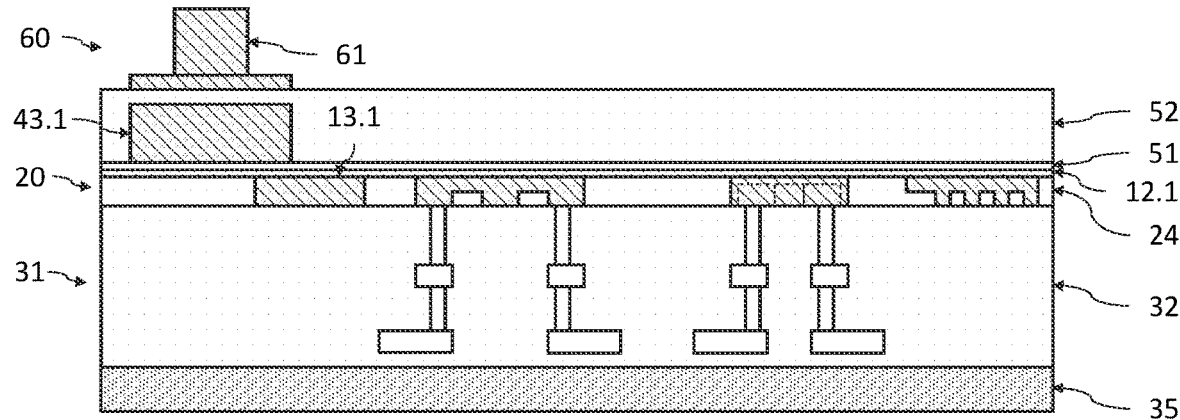

With reference to FIG. 1H, the active waveguide 61 of the laser source 60 is produced. This step may be carried out in an identical or similar way to that described in the aforementioned document U.S. Ser. No. 10/488,587B2. Thus, a stack forming a heterostructure based on the III-V compound may be bonded to the encapsulating layer 52, preferably via transfer of a Ill-V die. The active waveguide 61 is then produced using conventional operations of photolithography and of local etching. The active waveguide 61 is positioned in the XY-plane so as to permit optical coupling to the intermediate waveguide 43.1.

Figure 1I:
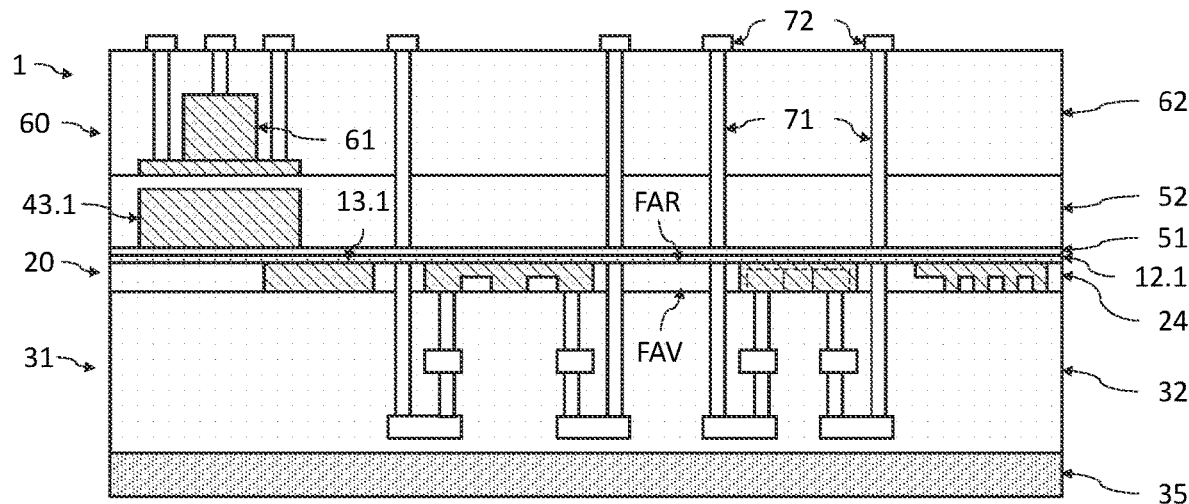

With reference to FIG. 1I, an encapsulating layer 62 made of an insulating material such as a dielectric, an oxide for example, is deposited so as to cover the active waveguide 61. Next, conductive vias 71 and contact pads 72 are produced. The conductive vias 71 pass through the oxide layers and connect the contact pads to the metallization lines of the interconnect portion 31. They thus allow electrical connection on the one hand to the active waveguide 61, and on the other hand to the integrated photonic circuit 20 by way of the interconnect portion 31.

A photonics-on-silicon optoelectronic system 1 comprising a hybrid laser source 60 and an integrated photonic circuit 20 that are optically coupled to each other by an intermediate waveguide 43.1 is thus obtained. The lower waveguide 13.1 and the intermediate waveguide 43.1 are both made of single-crystal silicon from different SOI substrates 10, 40, and have uniform thicknesses that are different from each other. Thus, the lower waveguide 13.1 therefore has a thickness e1 that is for example smaller than or equal to about 350 nm, and for example comprised between about 170 nm and 310 nm, and that is configured to ensure correct operation of the optical components of the integrated photonic circuit 20. Furthermore, the intermediate waveguide 43.1 has a thickness e2 for example comprised between about 400 and 600 nm, allowing good optical coupling to the active waveguide 61 of the laser source 60.

The integrated photonic circuit 20 (with its lower waveguide 13.1) was produced from the thin single-crystal-silicon layer 13 of the first SOI substrate 10, and the intermediate waveguide 43.1 was produced from the thin single-crystal-silicon layer 43 of the second SOI substrate 40 then joined to the first substrate 10. This intermediate waveguide 43.1 was therefore not produced by means of operations of deposition of amorphous silicon and of planarization by chemical-mechanical polishing, and hence it actually has the desired dimensions (and notably a uniform thickness e2). Thus, the fabricating process does not have an increased complexity and allows an optoelectronic system 1 the performance of which was not degraded during the fabricating process to be obtained.

It will moreover be noted that this embodiment makes it possible not to modify the technological approach used to produce the integrated photonic circuit 20 and the interconnect portion 31. Specifically, the step of producing the intermediate waveguide 43.1 is performed once the interconnect portion 31 has been produced.

In this example, the contact pads of the laser source 60 and those of the integrated photonic circuit 20 are located on the back side FAR. As a variant, the contact pads of the integrated photonic circuit 20 may be placed on the front side FAV. To this end, a handle is joined to the encapsulating layer 62 and the handle 35 is removed, with a view to subsequent production of the contact pads in question.

Figure 4A:
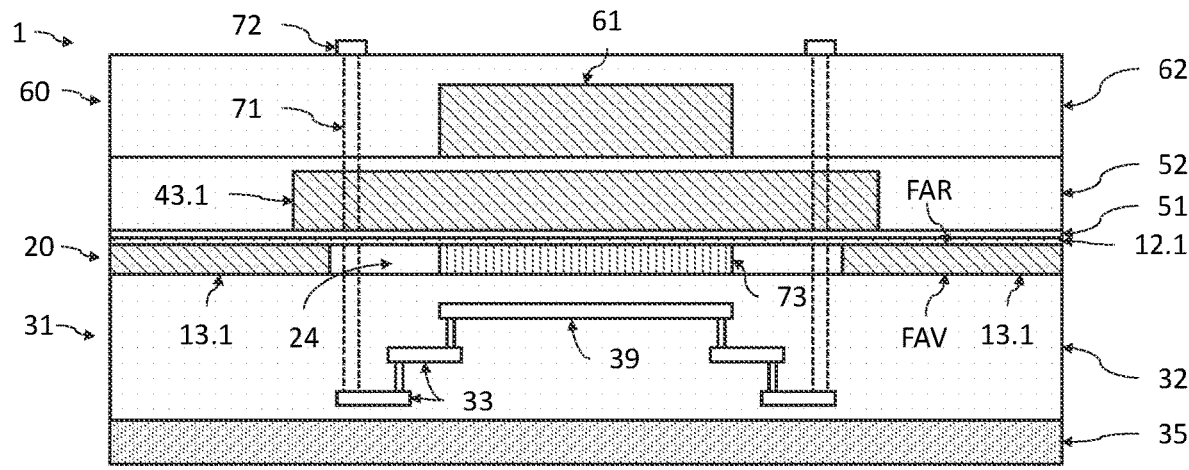
FIGS. 4A to 4C are schematic and partial cross-sectional views of various optoelectronic systems according to variants of embodiment in which the laser source is a DFB laser source with the active waveguide in back-side configuration (FIG. 4A) and with the active waveguide in front-side configuration (FIG. 4B), and in which the laser source is a DBR laser source in back-side configuration (FIG. 4C).
Figure 4B:
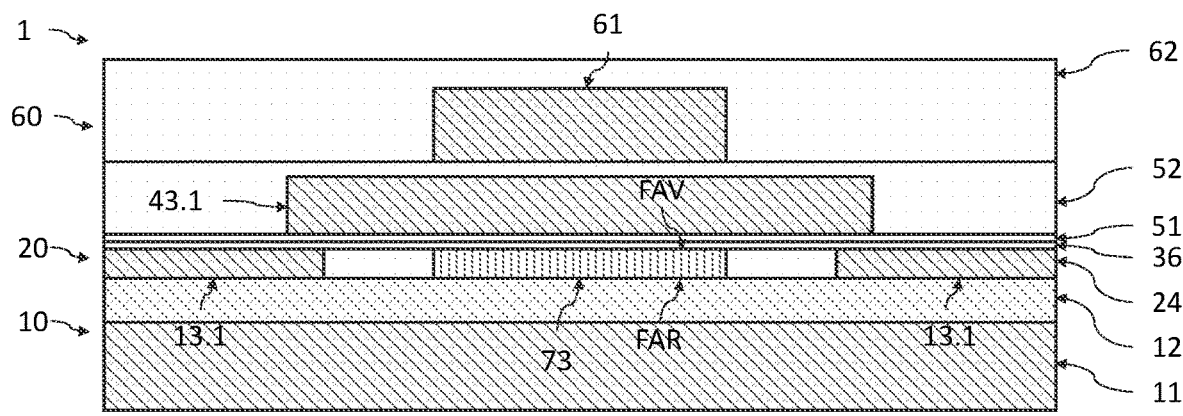
Figure 4C:
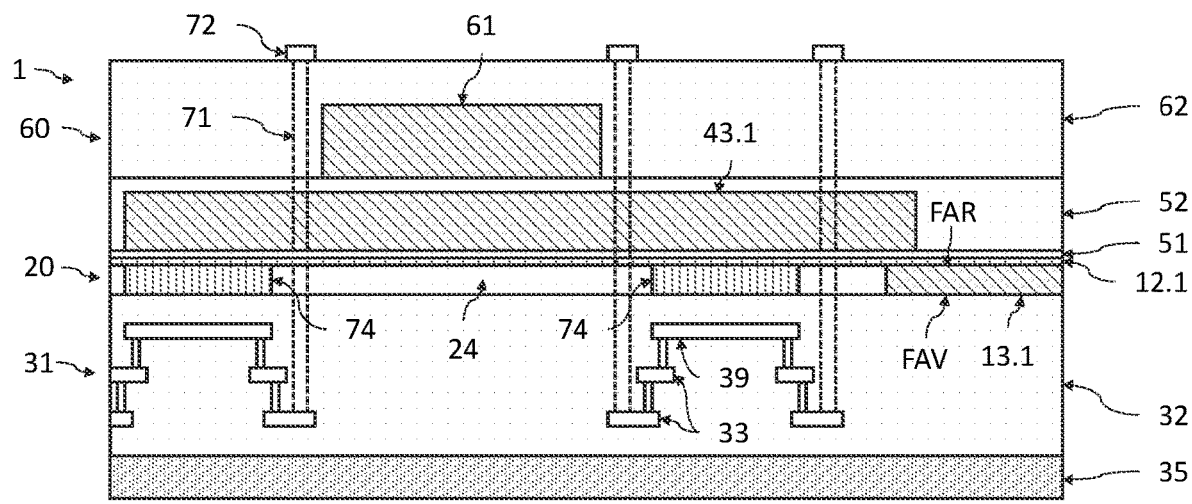

Moreover, for the sake of clarity, the Bragg mirrors have not been shown. However, the laser source 60 may be a DBR laser source or indeed a DFB laser source (see FIG. 4A to 4C) and the one or more Bragg mirrors may be produced based on single-crystal silicon and be located coplanar with the lower waveguide 13.1, as FIG. 4A to 4C illustrate.

FIGS. 2A to 2F illustrate, schematically, steps of a process for fabricating an optoelectronic device 1 according to a second embodiment. In this example, the active waveguide 61 of the laser source 60 is located on the front side FAV of the integrated photonic circuit 20. This process makes it possible to avoid using the handle 35, and to avoid the operations required to flip the stack produced. It also differs from that of FIG. 1A to 1I essentially in that the integrated photonic circuit 20 does not comprise a BEOL interconnect portion 31.

Figure 2A:
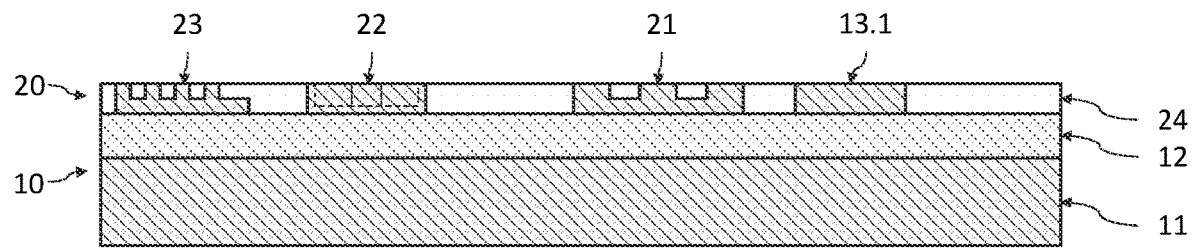
FIGS. 2A to 2F are schematic and partial cross-sectional views illustrating various steps of a process for fabricating an optoelectronic system according to a second embodiment in which the active waveguide of the laser source is located on the front side FAV of the integrated photonic circuit.

With reference to FIG. 2A, the first SOI substrate 10 is provided, and the integrated photonic circuit 20 is produced from the thin single-crystal-silicon layer 13 (see FIG. 1A). Next, the insulating layer 24 is deposited to fill the spacing between the optical components 13.1, 21, 22, 23. These operations are identical or similar to those described with reference to FIG. 1A, and are not detailed again here.

Figure 2B:
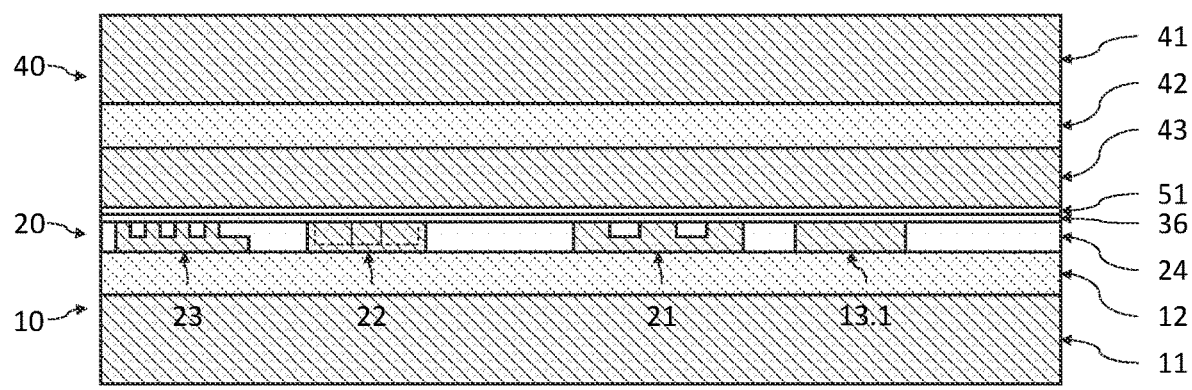

With reference to FIG. 2B, the second SOI substrate 40 is joined to the obtained stack so that the thin single-crystal-silicon layer 43 is oriented toward the integrated photonic circuit 20. In other words, the SOI substrate 40 is oriented so that the thin layer 43 is located facing the integrated photonic circuit 20. The two SOI substrates may be joined by oxide-oxide direct bonding. To this end, a thin bonding layer 36 made of oxide is deposited on the integrated photonic circuit 20, and another thin bonding layer 51 made of oxide is deposited on the thin silicon layer 43. Next, the two thin bonding layers 36, 51 are brought into contact with each other. The cumulative thickness of the two thin layers 36, 51 is uniform in the XY plane, and is configured to optimize the optical coupling between the intermediate waveguide 43.1 and the lower waveguide 13.1.

Figure 2C:
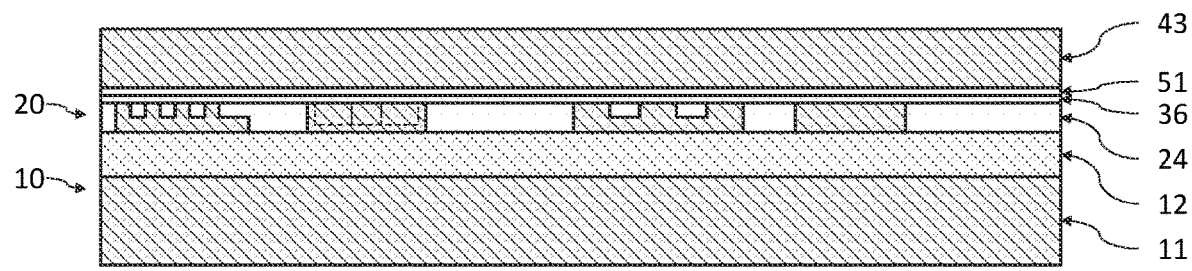
Figure 2D:
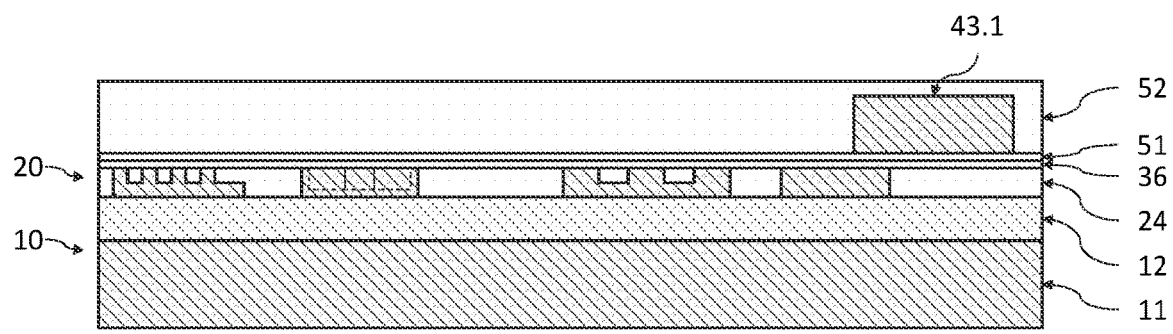
Figure 2E:
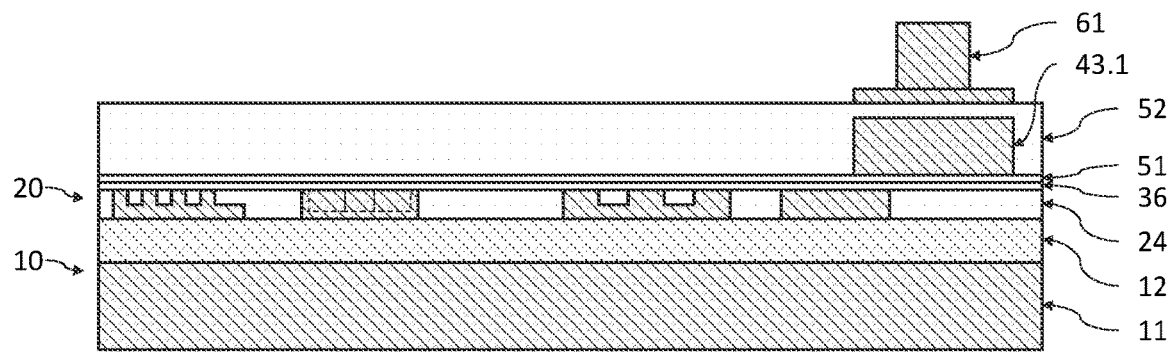

With reference to FIGS. 2C, 2D and 2E, the carrier substrate 41 and the buried-oxide layer 42 are removed to uncover the thin silicon layer 43 and thus free its surface. Next, the intermediate waveguide 43.1 is produced by photolithography and local etching of the thin silicon layer 43. The encapsulating layer 52 is then deposited. Next, the active waveguide 61 is produced based on a III-V compound. These steps are identical or similar to those described with reference to FIG. 1E to 1G.

Figure 2F:
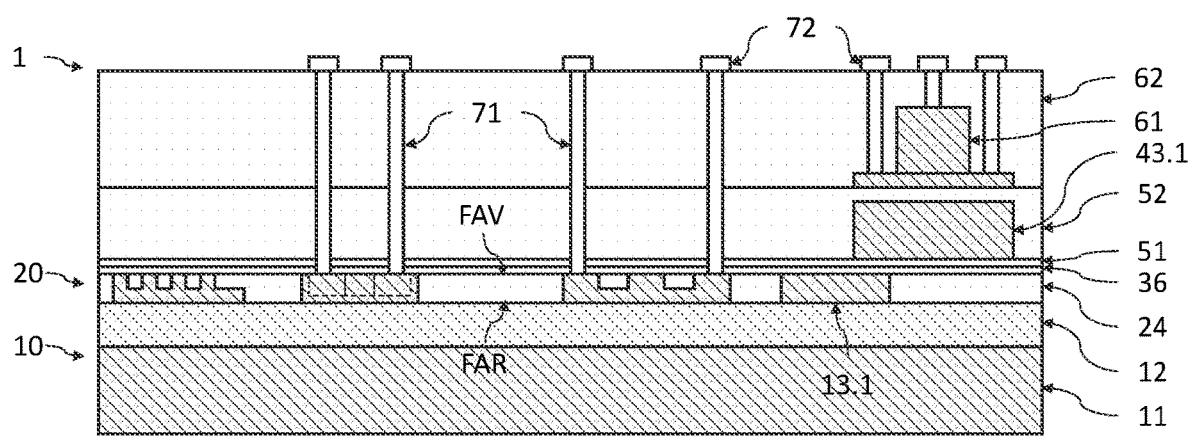

With reference to FIG. 2F, the encapsulating layer 62 is deposited so as to cover the active waveguide 61. Next, conductive vias 71 and contact pads 72 are produced. The conductive vias 71 allow electrical connection on the one hand to the active waveguide 61 and on the other hand to the optical components of the integrated photonic circuit 20. Here, the optoelectronic system 1 does not comprise the BEOL interconnect portion 31 that allows, as shown in FIG. 1I, electrical connection to the optical components.

Thus, an optoelectronic system 1 comprising a hybrid laser source 60 and an integrated photonic circuit 20 that are optically coupled to each other by an intermediate waveguide 43.1 is obtained, in which the active waveguide 61 is located on the front side FAV of the integrated photonic circuit 20. Here also, the optical coupling between the active waveguide 61 and the lower waveguide 13.1 occurs by means of the intermediate waveguide 43.1, which is made of single-crystal silicon, and which is obtained from the thin silicon layer 43 of the second SOI substrate 40. This intermediate waveguide 43.1 is therefore not produced using operations of deposition of amorphous silicon then of planarization by chemical-mechanical polishing (as otherwise the fabricating process would be complexified), and therefore has the desired dimensions, and in particular a uniform thickness in the XY-plane. The optoelectronic system 1 therefore has the expected performance, since the lower waveguide 13.1 has a thickness that ensures the optical components operate correctly, and since the intermediate waveguide 43.1 has a thickness that optimizes the optical coupling to the active waveguide 61. It will be noted that this embodiment allows the various steps to all be carried out on the same side of the integrated photonic circuit 20, namely on the front side FAV. It is not necessary to use a handle or to flip the stack produced.

Figure 3A:
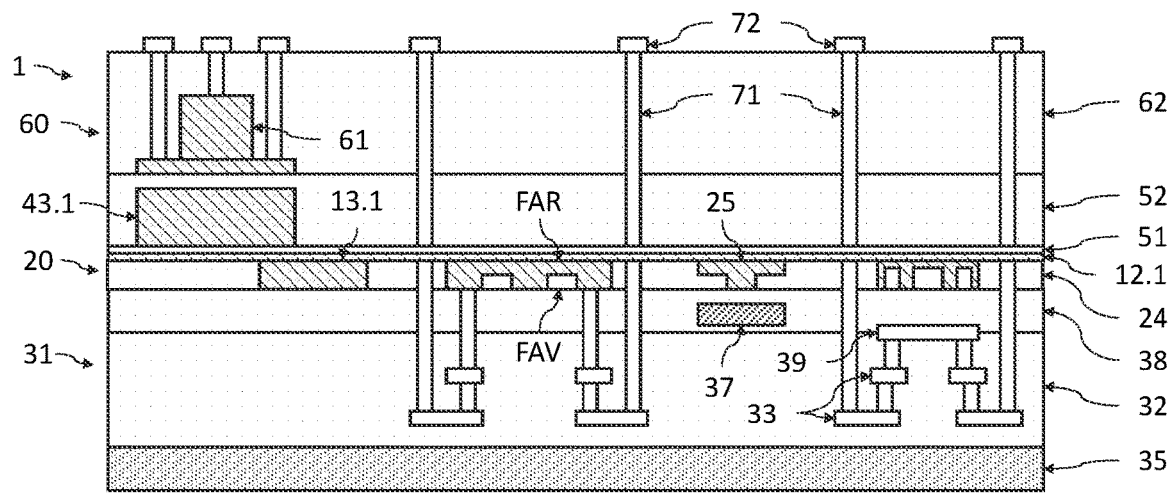
FIGS. 3A and 3B are schematic and partial cross-sectional views of various optoelectronic systems according to variants of embodiment comprising at least one waveguide based on a silicon nitride and at least one heater, in configurations in which the active waveguide is located on the back side FAR (FIG. 3A) and on the front side FAV (FIG. 3B)
Figure 3B:
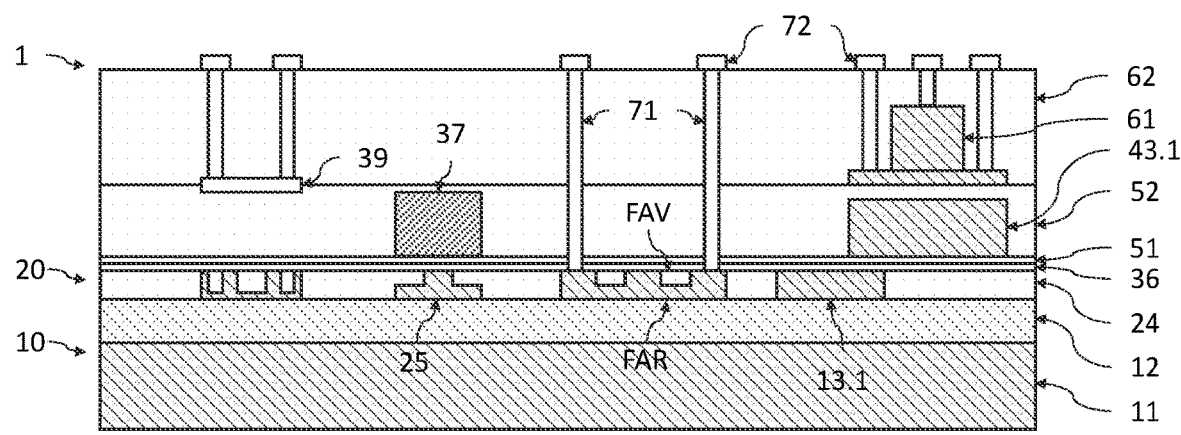

FIGS. 3A and 3B are schematic and partial cross-sectional views of two optoelectronic systems 1 according to variants of embodiment that incorporate a heater 39 and at least one waveguide 37 based on a silicon nitride SiN. These examples are given by way of illustration and other arrangements are of course possible.

With reference to FIG. 3A, the optoelectronic system 1 is a variant of that of FIG. 1I, in the sense that the active waveguide 61 is located on the back side FAR of the integrated photonic circuit 20. In this example, a waveguide 37 based on SiN is produced on the front side FAV of the integrated photonic circuit 20, before the interconnect portion 31 is produced. This waveguide 37 is here located in an insulating layer 38, and is here spaced apart from a silicon waveguide 25 along the Z-axis by a distance that here permits the optical coupling between these waveguides 25, 37. Moreover, a heater 39 is provided, here facing another silicon waveguide, and is connected to the interconnect portion 31. This heater is here one of the metallization levels 33. The waveguide 37 may notably be produced after the deposition of the insulating layer 38, by filling a notch produced in the latter.

With reference to FIG. 3B, the optoelectronic system 1 is a variant of that of FIG. 2F, in the sense that the active waveguide 61 is located on the front side FAV of the integrated photonic circuit 20. In this example, a waveguide 37 based on SiN is produced on the front side FAV of the integrated photonic circuit 20, in the insulating layer 52 encapsulating the intermediate waveguide 43.1. It is here spaced apart from the silicon waveguide 25 by the cumulative thickness of the two thin bonding layers 36, 51, but it may as a variant in addition be spaced apart by a segment of the encapsulating layer 52. Moreover, a heater 39 is provided, here facing another silicon waveguide, and is spaced apart therefrom by at least one portion of the encapsulating layer 52. It will be noted that the waveguide 37 may be produced after the deposition of the encapsulating layer 52, by filling a notch produced therein. However, the spacing along the Z-axis between the waveguide 37 and the subjacent silicon waveguide 25 may then not be precisely controlled. As a variant, the waveguide 37 may be produced using a subtractive process: when the intermediate waveguide 43.1 has been produced and before the encapsulating layer 52 is deposited, a wafer-level deposit of SiN is produced then etched locally to form the waveguide 37. The encapsulating layer 52 is then deposited. It will be noted that spacers made of SiN may form on the sidewalls of the intermediate waveguide 43.1, and that these spacers will possibly be removed chemically (while taking care to well protect the waveguide 37).

FIGS. 4A to 4C are schematic and partial cross-sectional views of optoelectronic systems 1 according to variants of embodiment that incorporate at least one Bragg mirror, and which may be similar to the examples of FIGS. 3A and 3B.

In the example of FIG. 4A, the optoelectronic system 1 is similar to that of FIG. 1I in that it comprises an interconnect portion 31 produced on the front side FAV and in that the active waveguide 61 is located on the back side FAR of the integrated photonic circuit 20. The laser source 60 is here a DFB laser source, and comprises a Bragg mirror 73 that extends under the intermediate waveguide 43.1 (and therefore also under the active waveguide 61) and defines the optical cavity. The Bragg mirror 73 is therefore not located in a plane located between the active waveguide 61 and the lower waveguide 13.1.

The Bragg mirror 73 is produced from the thin single-crystal-silicon layer 13 of the first SOI substrate, and is therefore coplanar with the lower waveguide 13.1. It is in particular produced by making a series of notches, through-notches for example, in the thin single-crystal-silicon layer 13, these notches then being filled by the dielectric of the insulating layer 24. The notches of the Bragg mirror 73 may be produced at the same time as at least one waveguide of the integrated photonic circuit 20 is produced, in a single local etching step.

Moreover, the fact that the notches are through-notches (and therefore that the insulating material extends right through the thickness of the thin layer 13) allows the process to be made more robust. Specifically, the situation differs from the prior-art situation in which the Bragg mirror is located in proximity to the active waveguide. The teeth of the Bragg mirror are then produced by partially etching the thin silicon layer, for example to a depth of the order of 10 nm or even of a few tens of nanometers. In contrast, in the example of FIG. 4A to 4C, the teeth of the Bragg mirror 73 (just like those of the mirrors 74) extend right through the thickness of the thin layer 13 (in the through-notches) in so far as the Bragg mirror 73 (and the mirrors 74) is (are) further from the active waveguide 61, and therefore necessarily from the equivalent Bragg mirror.

Moreover, in this example, a heater 39 is produced facing the Bragg mirror 73 (on the front side FAV), and is connected to the interconnect portion 31 (it here corresponds to one of the metallization levels 33). It allows the wavelength of the laser source 60 to be tuned.

In the example of FIG. 4B, the optoelectronic system 1 is similar to that of FIG. 4A in the sense that the laser source 60 is a DFB laser source, but the active waveguide 61 is located on the front side FAV of the integrated photonic circuit 20. It may be produced using a process similar to that described with reference to FIG. 2A to 2F. As in FIG. 4A, the Bragg mirror 73 is produced from the thin single-crystal-silicon layer 13 of the first substrate 10, and is therefore coplanar with the lower waveguide 13.1. It therefore makes contact with the buried-oxide layer 12 of the first SOI substrate 10. In this example, the optoelectronic system 1 does not therefore comprise a tuning heater located facing the Bragg mirror 73.

In the example of FIG. 4C, the optoelectronic system 1 is similar to that of FIG. 4A, in the sense that the active waveguide 61 is located on the back side FAR of the integrated photonic circuit 20. In contrast, the laser source 60 is a DBR laser source. Thus, the laser source 60 comprises two Bragg mirrors 74 that extend under the intermediate waveguide 43.1 and define the optical cavity. The optical mode is guided through the intermediate waveguide 43.1 and is optically coupled by evanescence to the Bragg mirrors 74. The Bragg mirrors 74 are produced from the thin single-crystal-silicon layer 13 of the first SOI substrate 10, and are therefore coplanar with each other and with the lower waveguide 13.1.

Of course, as a variant, the optoelectronic system 1 may also comprise a DBR laser source 60 with a configuration in which the active waveguide 61 is located on the front side FAV of the integrated photonic circuit 20.

Particular embodiments have just been described. Various modifications and variants will be obvious to anyone skilled in the art.

The invention claimed is:

1. A process for fabricating a photonics-on-silicon optoelectronic system comprising an optical device and an integrated photonic circuit, the optical device comprising an upper waveguide, and the integrated photonic circuit comprising a lower waveguide that is made of single-crystal silicon and that extends in a lower plane, the upper waveguide being optically coupled to the lower waveguide by an intermediate waveguide that is made of silicon and that extends longitudinally in an intermediate plane that is distinct from and parallel to the lower plane, the process comprising:
  providing a first silicon-on-insulator substrate comprising a first thin single-crystal-silicon layer that is of a first thickness e1 and that has a back side which is oriented toward a buried-oxide layer of the first silicon-on-insulator substrate, and an opposite front side;
  producing the lower waveguide by etching the first thin silicon layer locally; then
  producing the intermediate waveguide; then producing the upper waveguide of the optical device;
  wherein the step of producing the intermediate waveguide comprises:
    joining the first silicon-on-insulator substrate to a second silicon-on-insulator substrate comprising a second thin single-crystal-silicon layer of a second thickness e2 different from e1, the second thin silicon layer being located facing the integrated photonic circuit;

removing a carrier substrate and a buried-oxide layer of the second silicon-on-insulator substrate, so as to free one side of the second thin silicon layer; and producing the intermediate waveguide by etching the second thin silicon layer locally, the etched second thin silicon layer forming the intermediate waveguide.

2. The fabricating process as claimed in claim 1, wherein the intermediate waveguide is partially superposed both with the lower waveguide and with the upper waveguide.

3. The fabricating process as claimed in claim 1, wherein the lower waveguide has a uniform thickness equal to the value e1, and the intermediate waveguide has a uniform thickness equal to the value e2.

4. The fabricating process as claimed in claim 1, comprising:

depositing a thin bonding layer based on an oxide on the second thin silicon layer, depositing a thin oxide layer covering the integrated photonic circuit, and joining the first and second silicon-on-insulator substrates by bringing the thin bonding layer into contact with the thin oxide layer.

5. The fabricating process as claimed in claim 4, wherein the thin oxide layer is produced by thinning the buried-oxide layer of the first silicon-on-insulator substrate.

6. The fabricating process as claimed in claim 5, comprising, following production of the integrated photonic circuit which comprises active optical components, producing, on the front side, an interconnect portion comprising metallization levels that are connected to the active optical components by conductive vias that extend through an inter-metal insulating layer.

7. The fabricating process as claimed in claim 6, comprising, subsequently to production of the interconnect portion, joining a handle to a free side of the interconnect portion, then removing a carrier substrate of the first silicon-on-insulator substrate, then thinning the buried-oxide layer to obtain a thinned buried-oxide layer.

8. The fabricating process as claimed in claim 4, wherein the thin oxide layer is produced by depositing an oxide on the front side of the integrated photonic circuit.

9. The fabricating process as claimed in claim 1, comprising a producing at least one Bragg mirror by forming through-notches in the first thin silicon layer, which through-notches are then filled with an electrically insulating material, the through-notches being produced simultaneously to production of at least one waveguide of the integrated photonic circuit, in a same local etching process.

10. A photonics-on-silicon optoelectronic system comprising the optical device and the integrated photonic circuit fabricated as recited in claim 1.

11. The optoelectronic system as claimed in claim 10, the optical device being chosen from a modulator, a photodiode, a semiconductor optical amplifier, or a laser source in which the upper waveguide is an active waveguide containing a gain medium, the upper waveguide being produced from a semiconductor based on a III-V compound, on a IV element or compound, or on a II-VI compound.

12. The optoelectronic system as claimed in claim 10, wherein the lower waveguide has a uniform thickness e1 smaller than 350 nm, and the intermediate waveguide has a uniform thickness e2 comprised between 400 nm and 600 nm.

13. The optoelectronic system as claimed in claim 10, comprising at least one Bragg mirror produced from single-crystal silicon and located coplanar with the lower waveguide.

14. The optoelectronic system as claimed in claim 13, wherein the Bragg mirror extends under and along the intermediate waveguide and is evanescently coupled thereto, the optical device being a distributed-feedback laser source; or comprising two Bragg mirrors located under the intermediate waveguide, the optical device being a distributed-Bragg-reflector laser source.

15. The optoelectronic system as claimed in claim 14, comprising at least one heater located, on the front side of the integrated photonic circuit, facing the Bragg mirror, the heater being a metallization level within an interconnect portion comprising metallization levels that are connected to active optical components of the integrated photonic circuit by conducting vias that extend through an inter-metal insulating layer.

* * * * *